United States Patent
Park

(10) Patent No.: US 9,857,894 B2
(45) Date of Patent: Jan. 2, 2018

(54) TOUCH PANEL HAVING A COLOR FILM THAT INCLUDES A COLOR PART

(71) Applicant: LG INNOTEK CO., LTD., Seoul (KR)

(72) Inventor: Hun Bae Park, Seoul (KR)

(73) Assignee: LG Innotek Co., Ltd., Seoul (KR)

( * ) Notice: Subject to any disclaimer, the term of this patent is extended or adjusted under 35 U.S.C. 154(b) by 167 days.

(21) Appl. No.: 14/540,254

(22) Filed: Nov. 13, 2014

(65) Prior Publication Data
US 2015/0130763 A1    May 14, 2015

(30) Foreign Application Priority Data

Nov. 13, 2013  (KR) .................. 10-2013-0137557

(51) Int. Cl.
*G06F 3/041* (2006.01)
*G06F 3/044* (2006.01)

(52) U.S. Cl.
CPC .............. *G06F 3/041* (2013.01); *G06F 3/044* (2013.01); *G06F 3/0416* (2013.01); *G06F 2203/04103* (2013.01)

(58) Field of Classification Search
CPC ................................ G06F 3/044; G06F 3/0416
USPC ...................................................... 345/173
See application file for complete search history.

(56) References Cited

U.S. PATENT DOCUMENTS

| | | | | |
|---|---|---|---|---|
| 2010/0309151 A1* | 12/2010 | Cheng | ............. | G06F 3/045 345/173 |
| 2011/0099805 A1* | 5/2011 | Lee | ............. | G06F 3/044 29/846 |
| 2011/0175841 A1* | 7/2011 | Nakamura | ............. | G06F 1/1626 345/173 |
| 2012/0103777 A1* | 5/2012 | Kang | ............. | G06F 3/044 200/600 |
| 2012/0154302 A1* | 6/2012 | Cho | ............. | G06F 3/044 345/173 |
| 2012/0228106 A1* | 9/2012 | Horino | ............. | G06F 3/044 200/5 A |
| 2012/0299638 A1* | 11/2012 | Han | ............. | G06F 3/044 327/517 |
| 2013/0161177 A1* | 6/2013 | Lee | ............. | G06F 3/044 200/512 |
| 2013/0229364 A1* | 9/2013 | Yu | ............. | G06F 3/044 345/173 |
| 2013/0277094 A1* | 10/2013 | Lee | ............. | H05K 3/361 174/254 |
| 2013/0314347 A1* | 11/2013 | Muraoka | ............. | H01H 9/02 345/173 |
| 2014/0168133 A1* | 6/2014 | Yilmaz | ............. | G06F 3/0412 345/174 |

FOREIGN PATENT DOCUMENTS

KR  10-2011-0047473 A   5/2011
KR  10-2013-0053939 A   5/2013

* cited by examiner

*Primary Examiner* — Yuzhen Shen
(74) *Attorney, Agent, or Firm* — KED & Associates LLP

(57) ABSTRACT

A touch panel including a cover substrate includes an active area and an unactive area, and a color film on the cover substrate. The color film includes a color part provided at a position corresponding to a position of the unactive area, and the color part includes a conductive material.

6 Claims, 9 Drawing Sheets

[FIG. 1]
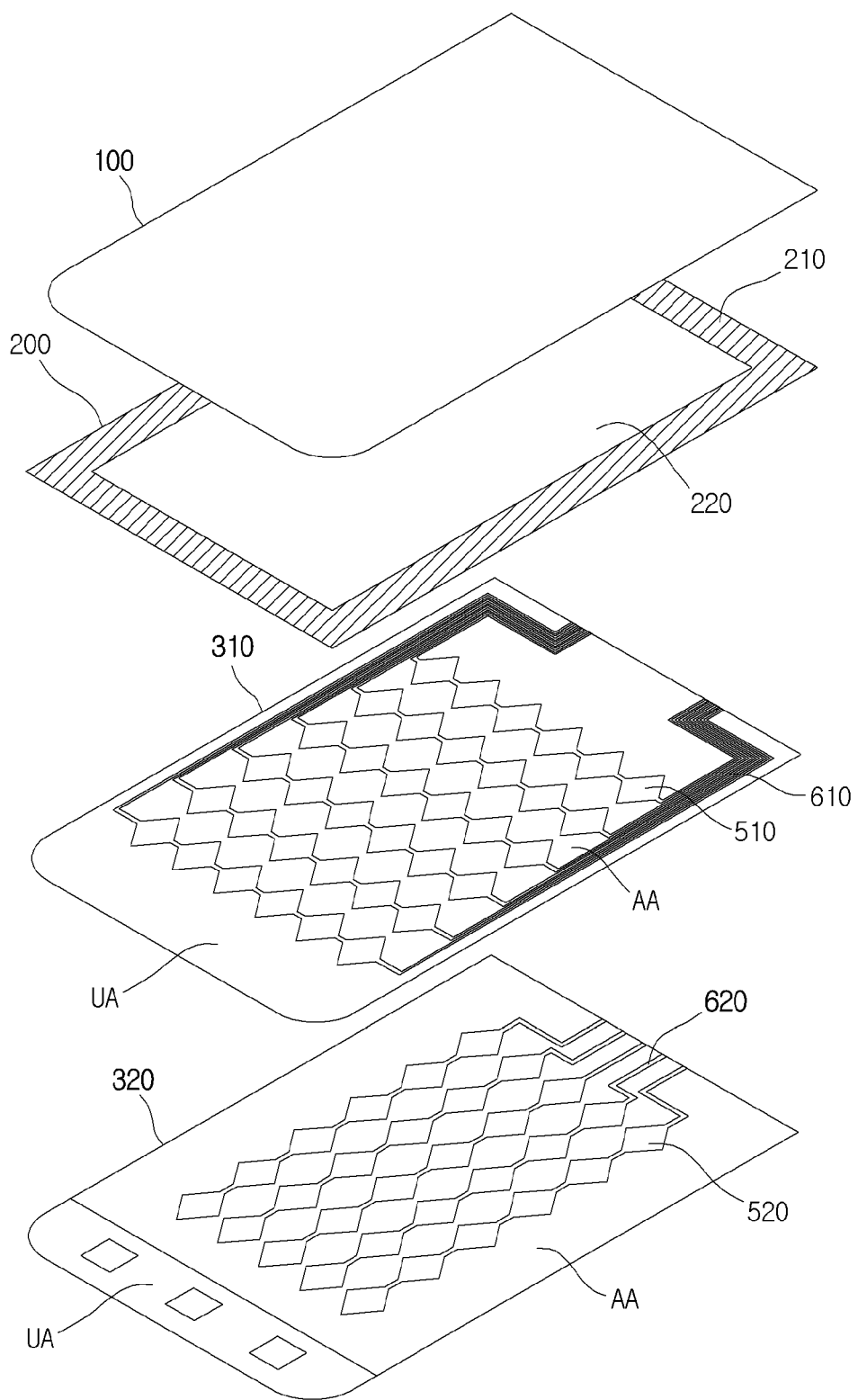

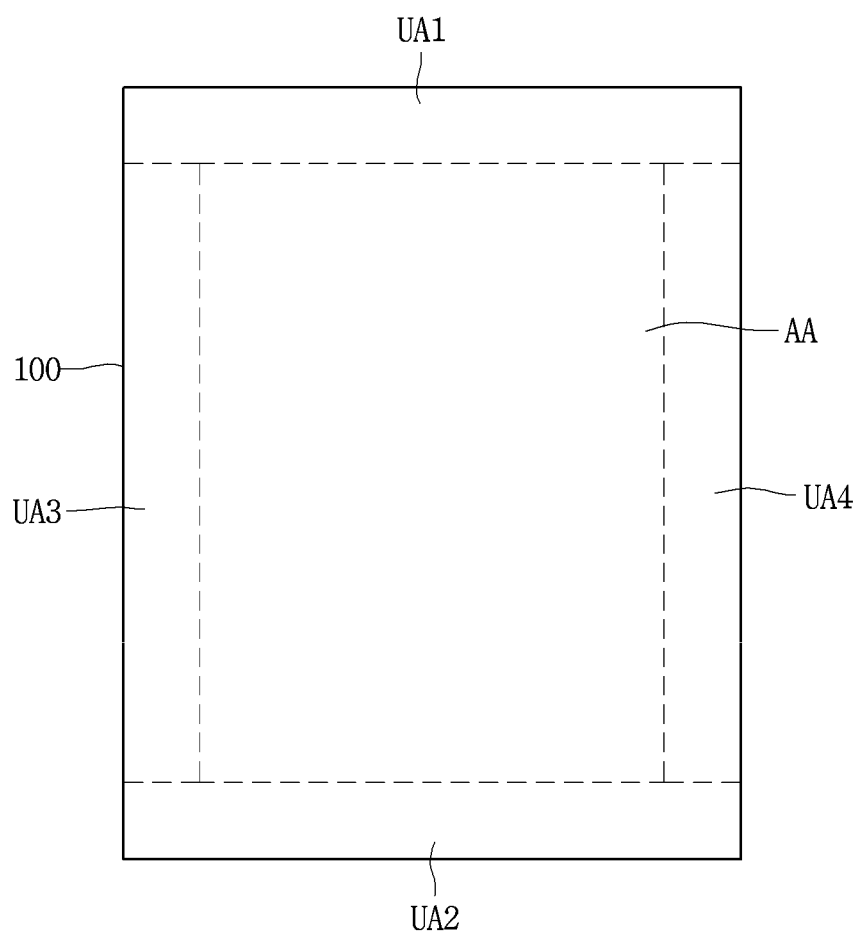
[FIG. 2]

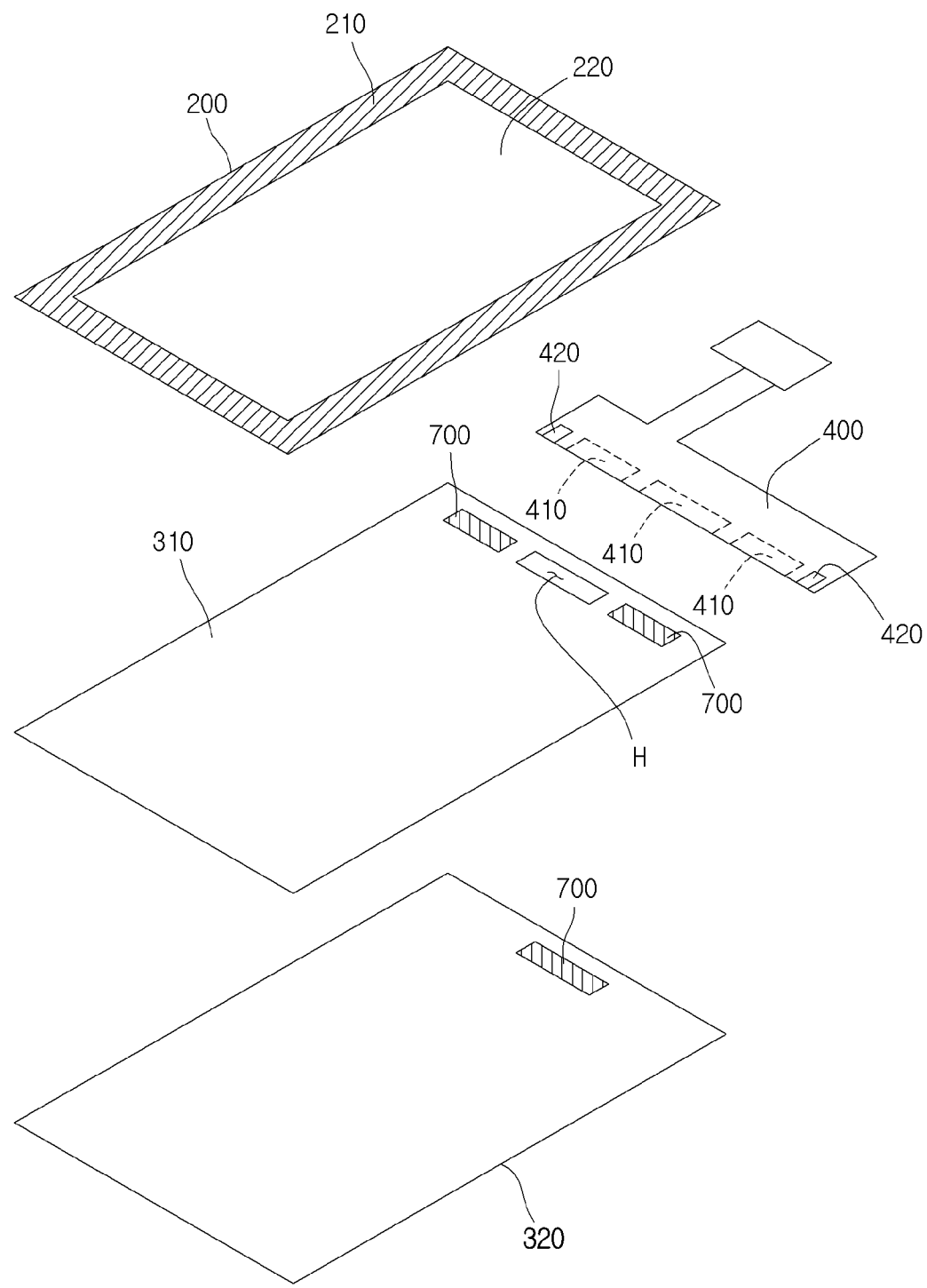
[FIG. 3]

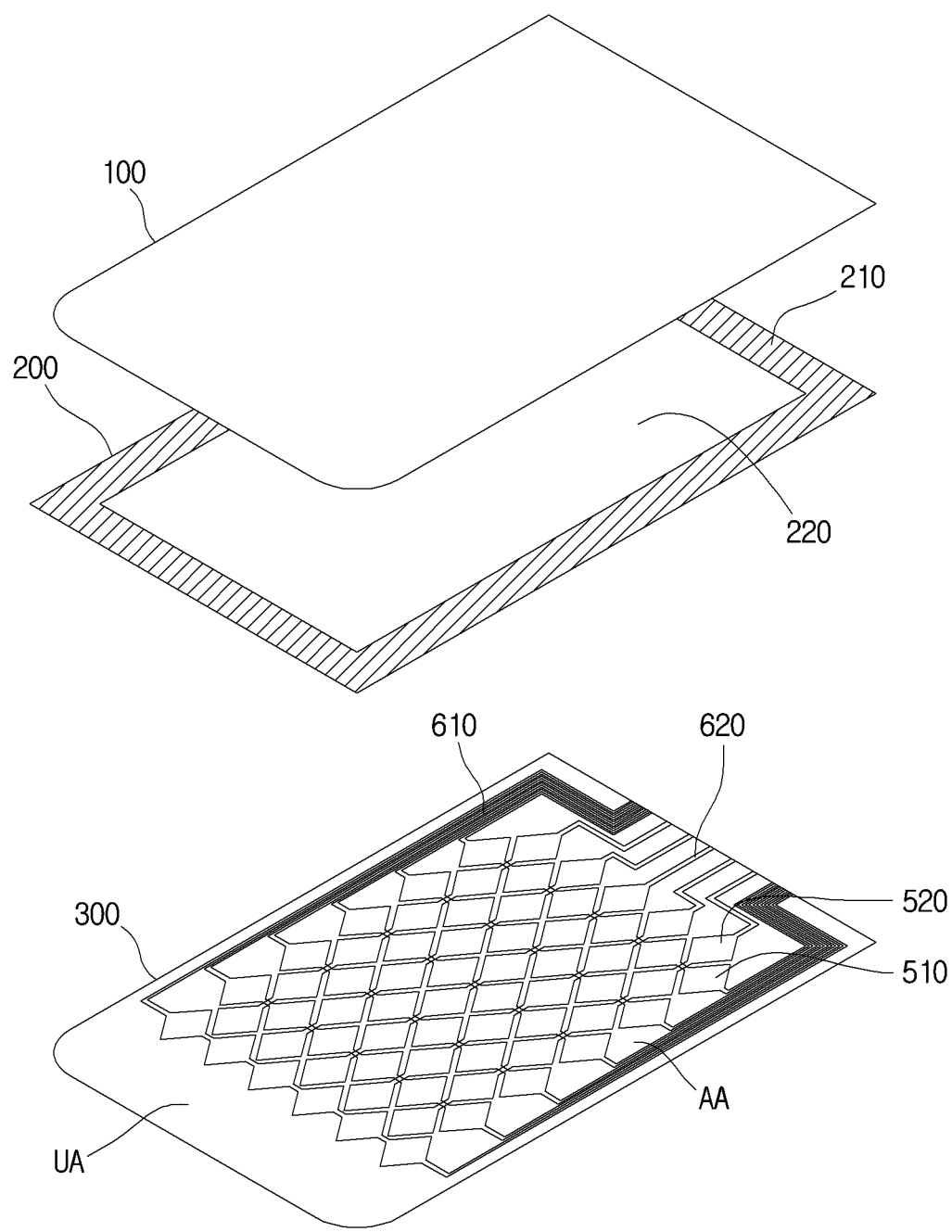

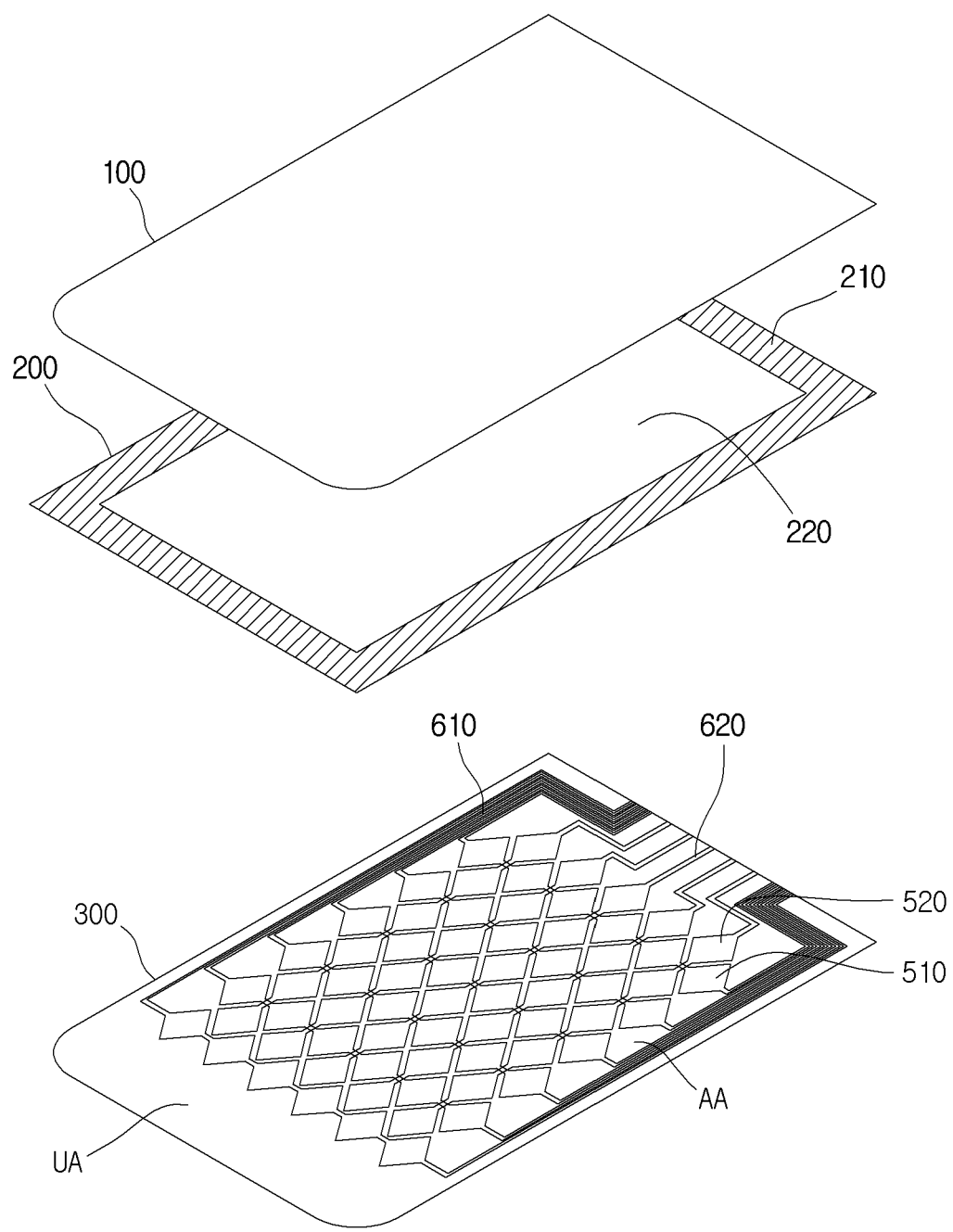

[FIG. 6]
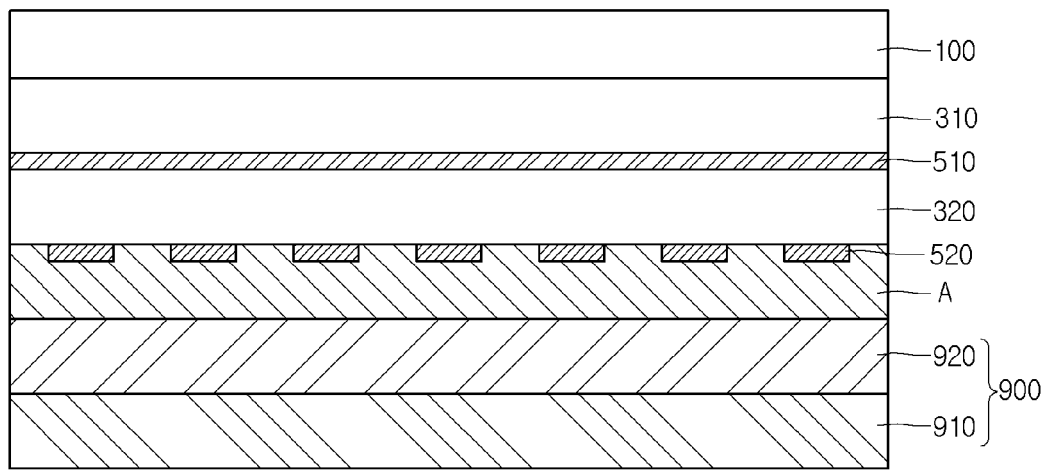
[FIG. 7]
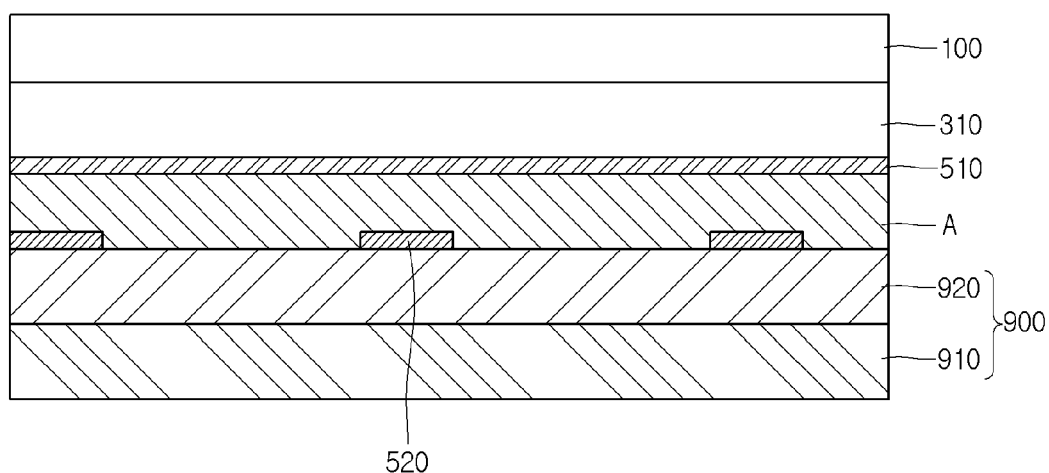

[FIG. 8]
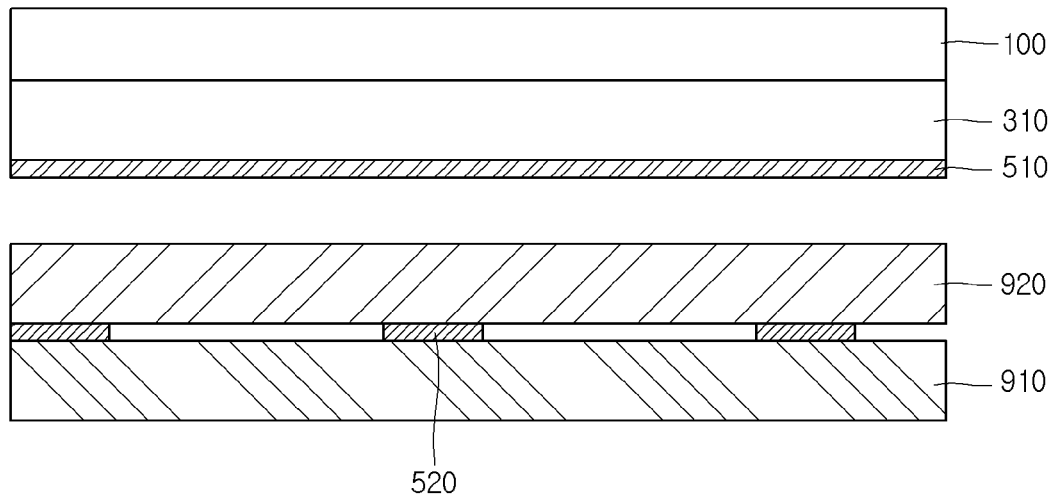
[FIG. 9]
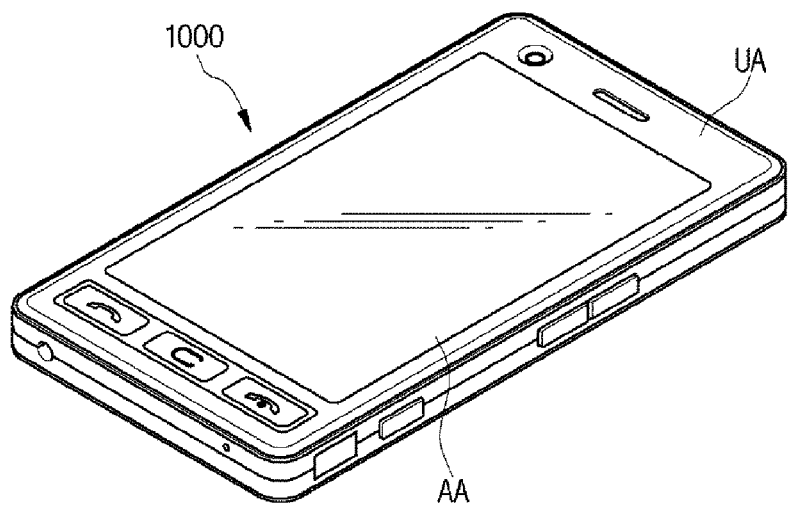

[FIG. 10]
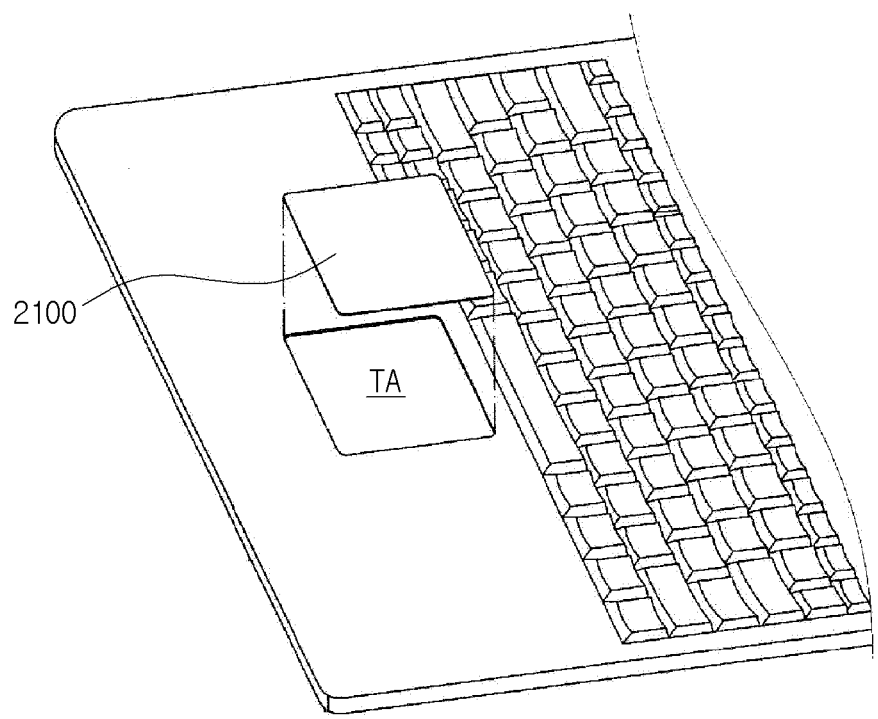
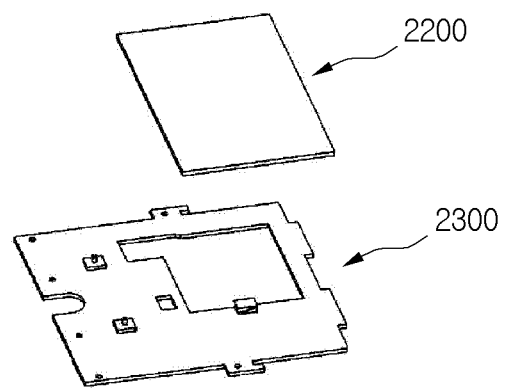

【FIG. 11】
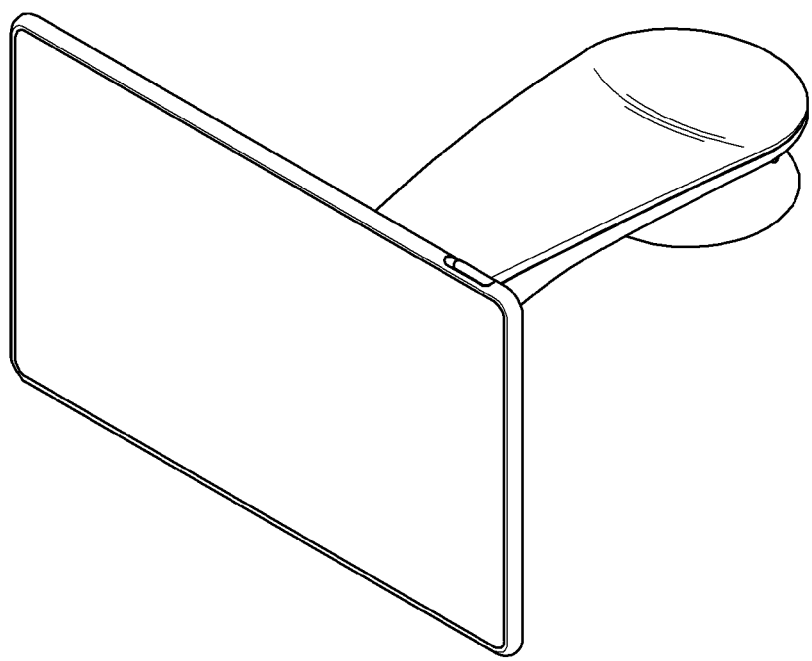
【FIG. 12】

TOUCH PANEL HAVING A COLOR FILM THAT INCLUDES A COLOR PART

CROSS-REFERENCE TO RELATED APPLICATION

This application claims priority under 35 U.S.C. §119 to Korean Application No. 10-2013-0137557 filed on Nov. 13, 2013, whose entire disclosure is incorporated herein by reference.

BACKGROUND

1. Field

The present disclosure relates to a touch panel.

2. Background

An input function through the touch of an image displayed on a touch panel by an input device, such as a stylus pen, or a finger has been applied to various electronic appliances. Various types of touch panels may be provided depending on positions of transparent electrodes formed in the touch panels. For example, the transparent electrode may be directly formed on a cover window.

The cover window is provided thereon with a substrate, and sensing and wire electrode may be formed on the substrate. The substrate may be provided at an edge thereof with a ground electrode to suppress electro-static discharge (ESD) applied from an outside.

Although the ground electrode is formed in an unactive area having the wire electrode, an area for the ground electrode is increasingly reduced as the unactive area is gradually narrowed. In other words, although the efficiency of the ground electrode is provided in proportional to the width of the ground electrode, the unactive area of the touch panel, e.g., left and right Bezels of the touch panel are widened if the width of the ground electrode is increased, resulting in increased left and right Bezels.

BRIEF DESCRIPTION OF THE DRAWINGS

The embodiments will be described in detail with reference to the following drawings in which like reference numerals refer to like elements wherein:

FIG. 1 is a perspective view showing a touch panel according to the first embodiment.

FIG. 2 is a top view showing a cover substrate according to the first embodiment.

FIG. 3 is a perspective view showing the assembling relationship between the touch panel according to the first embodiment and a printed circuit board.

FIGS. 4 and 5 are perspective views showing touch panels according to another embodiment.

FIGS. 6 to 8 are sectional views showing a touch device in which the touch panel according to the embodiment is assembled with a display panel.

FIGS. 9 to 12 are views showing an example of a touch device assembly employing the touch device according to the embodiment.

DETAILED DESCRIPTION

Referring to FIGS. 1 to 3, a touch panel according to the embodiment may include a cover substrate 100, a color film 200, a first substrate 310, a second substrate 320, and a printed circuit board 400. The cover substrate 100 may be rigid or flexible. For example, the cover substrate 100 may include glass or plastic. The cover substrate 100 may include chemically tempered glass, such as soda lime glass or aluminosilicate glass, plastic, such as polyethylene terephthalate (PET) or polyimide (PI), or sapphire.

A sapphire substrate has superior electric characteristics, such as permittivity, so that a touch response speed may be greatly increased and a space touch such as hovering may be easily implemented. The sapphire substrate has high surface strength. The hovering signifies a technique for recognizing coordinates even in a position of the input device or finger is spaced apart from a display by a short distance.

A portion of the cover substrate 100 may be curved with a curved surface. A portion of the cover substrate 100 may have a flat surface and another portion of the cover substrate 100 may be curved with a curved surface. An end portion of the cover substrate 100 may be curved with a curved surface or may be curved or bent with a surface having a random curvature.

The cover substrate 100 may have an active area AA and an unactive area UA defined therein. An image may be displayed in the active area AA. The image is not displayed in the unactive area UA provided at a peripheral portion of the active area AA.

The position of an input device or finger may be sensed in at least one of the active area AA and the unactive area UA. When a touch occurs at the touch window, a variation of capacitance occurs in the touched part, and the variation of the capacitance may be detected as a touch point.

The cover substrate 100 may be provided on one surface thereof with a color film 200. In detail, the color film 200 may be bonded to one surface of the cover substrate 100. The color film 200 may include a color part 210. In detail, the color film 200 may include the color part 210 formed at an edge of the color film 200. The color part 210 may be provided at a position corresponding to that of the unactive area UA of the cover substrate 100. In other words, the unactive area UA of the cover substrate 100 may be covered with the color part 210 of the color film 200.

The color film 200 may be provided at the center thereof with a light transmission part corresponding to the active area. The light transmission part refers to an area under the color film 200 viewed through the cover substrate 100.

The color part 210 may prevent a wire electrode, which is described later, from being viewed from the outside. The color part 210 may represent various colors. The color part 210 may represent various colors depending on desirable colors of an outer appearance of the touch panel. For example, the color part 210 may represent various colors, such as black, white, gold, silver, pink, red, and the mixture thereof.

The color part 210 may include a conductive material 220. The conductive material 220 may be formed along the edge of the color film 200 in which the color part 210 is provided. The conductive material 220 may be formed along an edge of at least one of both surfaces of the color film 200. That is to say, the conductive material 220 may be formed along an edge of one surface, an edge of an opposite surface, or edges of both surfaces of the color film 200. Accordingly, the color film 200 provided on the unactive area of the cover substrate 100 may include the color part 210 and the conductive material 220.

The conductive material 220 may include a metallic material. In detail, the conductive material 220 may include metallic powders. For example, the conductive material 220 may include metallic powders including aluminum and the alloy thereof.

In addition, the conductive material 220 may include a material the same as or similar to a material constituting the sensing electrode or the wire electrode which is described later. The conductive material 220 may be provided on an entire surface of the color part 210. In other words, the conductive material 220 may be provided on an entire portion of the color part 210 corresponding to the unactive area of the cover substrate 100.

Alternatively, the conductive material 220 may be partially provided on the color part 210. For example, the unactive area of the cover substrate 100 may include a first unactive area UA1, a second unactive area UA2, a third unactive area UA3, and a fourth unactive area UA4. The first to fourth unactive areas UA1 to UA4 may be coupled to each other while being adjacent to each other. The conductive material 220 may be provided at the color part 210 placed at a position corresponding to at least one of the first to fourth unactive areas UA1 to UA4.

The cover substrate 100 may be provided thereon with first and second substrates 310 and 320. The first and second substrates 310 and 320 may include plastic. For example, the first and second substrates 310 and 320 may include plastic such as polyethylene terephthalate (PET). The first substrate 310 may be provided on the cover substrate 100. The first substrate 310 may be provided on the bottom surface of the color film 200.

The first substrate 310 may include an active area and an unactive area identically to the cover substrate 100. The first substrate 310 may be provided thereon with a first sensing electrode 510 and a first wire electrode 610. In addition, although not shown in drawings, a ground electrode may be provided on the unactive area of the first substrate 310 adjacent to the first wire electrode 610. The first sensing electrode 510 may extend in a first direction on the active area of the first substrate 310.

In addition, the first wire electrode 610 may be provided on the unactive area of the first substrate 310. The first wire electrode 610 may be connected with the first sensing electrode 510 and extended toward an upper end or a lower end of the first substrate 310. In other words, one end of the first wire electrode 610 may be connected with the first sensing electrode 510, and an opposite end of the first wire electrode 610 may be connected with a printed circuit board 400 to be described later.

The second substrate 320 may be provided on the first substrate 310. In other words, the cover substrate 100, the first substrate 310, and the second substrate 320 may be sequentially provided. The second substrate 320 may include the active area and the unactive area identically to the cover substrate 100 and the first substrate 310.

The second substrate 320 may be provided thereon with a second sensing electrode 520 and a second wire electrode 620. In addition, although not shown in drawings, a ground electrode may be provided on the unactive area of the second substrate 320 while being adjacent to the second wire electrode 620.

The second sensing electrode 520 may extend in a second direction different from the first direction on the active area of the second substrate 310. In addition, the second wire electrode 620 may be provided on the unactive area of the second substrate 320. The second wire electrode 620 may be connected with the second sensing electrode 520 and may be extended to the upper and lower ends of the second substrate 320. In other words, one end of the second wire electrode 620 may be connected with the second sensing electrode 520, and an opposite end of the second wire electrode 620 may be connected with the printed circuit board 400 to be described later.

At least one of the first and second sensing electrodes 510 and 520 may include a conductive material. For example, at least one of the first and second sensing electrodes 510 or 520 may include a transparent conductive material so that electricity can be applied without the interruption of light transmission. For example, at least one of the first and second sensing electrodes 510 or 520 may include a metallic oxide, such as an indium tin oxide, an indium zinc oxide, a copper oxide, a tin oxide, a zinc oxide, or a titanium oxide.

However, the embodiment is not limited thereto. In other words, the first and/or second sensing electrodes 510 and 520 may also include nanowire, photosensitive nanowire film, carbon nanotube (CNT), graphene, or conductive polymer. In addition or alternatively, the first and/or second sensing electrodes 510 and 520 may include may include various metallic materials. For example, at least one of the first and second sensing electrodes 510 and 520 may include at least one of chromium (Cr), nickel (Ni), copper (Cu), aluminum (Al), silver (Ag), molybdenum (Mo), and the alloys thereof. In addition or alternatively, the first and/or second sensing electrodes 510 and 520 may also include sub-electrodes crossing each other, and may be formed in the shape of a mesh by the sub-electrodes.

The first and second wire electrodes 610 and 620 may include a conductive material. The first and second wire electrodes 610 and 620 may include a material the same as or similar to a material constituting the first and second sensing electrodes 510 and 520.

The color film 200, the first substrate 310, and the second substrate 320 may be connected with the printed circuit board 400. The color part 210 of the color film 200, the first wire electrode 610, and the second wire electrode 620 may be connected with the printed circuit board.

Referring to FIGS. 2 and 3, the printed circuit board 400 may be interposed between the cover substrate 100 and the first substrate 310. The printed circuit board 400 may be interposed between the cover substrate 100 having one surface, onto which the color film 200 is bonded, and the first substrate 310. The printed circuit board 400 may be flexible. In other words, the printed circuit board 400 may include a flexible printed circuit board (FPCB).

The printed circuit board 400 may be connected with the color part 210 of the color film 200, the first wire electrode 610 of the first substrate 310, and the second wire electrode 620 of the second substrate 320. One surface of the printed circuit board 400 may be connected with the color part 210, and an opposite surface of the printed circuit board 400 may be connected with the first and second wire electrodes 610 and 620. In other words, one surface of the printed circuit board 400 facing the color film 200 may be connected with the color part 210, and an opposite surface of the printed circuit board 400 facing the first substrate 310 may be connected with the first and second wire electrodes 610 and 620.

The printed circuit board 400 may be provided on the cover substrate 100 and the first substrate 310, and the first wire electrode 610 provided on the first substrate 310 may be connected with an opposite surface of the printed circuit board 400. In addition, the second wire electrode 620 provided on the second substrate 320 may be exposed through a through hole H formed in the substrate 310, and may be connected with the opposite surface of the printed circuit board 400 through the through hole H.

The printed circuit board 400 may be directly or indirectly connected with the first and second wire electrodes 610 and 620. The first and second wire electrodes 610 and 620 may be directly connected with the printed circuit board 400. In addition, the first and second wire electrodes 610 and 620 may be connected with the printed circuit board 400 through a pad part 700. For example, the first and second wire electrodes 610 and 620 may be connected with a first bonding part 410 of the printed circuit board 400 using the pad part and an anisotropic conductive film (ACF).

In addition or alternatively, the color part 210 may be connected with one surface of the printed circuit board 400. The color part 210 may be connected with one surface of the printed circuit board 400 facing the color film 200. For example, the color film 200 may be directly or indirectly connected with the printed circuit board 400. The color part 210 may be connected with one surface of the printed circuit board 400 through a conductive material. For example, a second bonding part 420 of the printed circuit board 400 may be electrically connected with the color part 210 through a conductive tape.

Accordingly, the color part 210 may be electrically connected with the printed circuit board 400. The color part 210 may serve as a ground electrode by the conductive material 220 included in the color part 210.

According to the touch panel of the embodiment, the printed circuit board 400 may be connected with the color part 210 including the conductive material, and the color part 210 may serve as a ground electrode to suppress external electric static. The color part 210, which is provided on the cover substrate 100 and formed at the edge of the color film 200, includes a metallic material, such as silver (Ag) or aluminum (Al), and is connected with the printed circuit board 400, so that the color part 210 may serve as the ground electrode with a decoration function.

According to the touch panel of the embodiment, the area for the ground electrode may be expanded. In other words, according to the touch panel of the embodiment, the ground electrode formed only on the first and second substrates is extend to the color film 200, so that the area for the ground electrode can be enlarged.

According to the touch panel of the embodiment, as the ground electrode is formed in the color part 210 of the color film 200, the area for the ground electrode can be enlarged without the increase in the left and right unactive areas of the first and second substrates for the purpose of enlarging the area for the ground electrode.

As a result, according to the touch panel of the embodiment, the area for the ground electrode can be enlarged, so that the ESD suppression effect can be improved, thereby improving the whole efficiency of the touch panel.

FIGS. 4 and 5 are perspective views showing touch panels according to another embodiment.

Referring to FIG. 4, a touch panel according to another embodiment may include the cover substrate 100 and a substrate 300 on the cover substrate 100. The first sensing electrode 510 may be provided on one surface of the substrate 300, and the second sensing electrode 520 may be provided on an opposite surface to one surface of the substrate 300.

Referring to FIG. 5, a touch panel according to still another embodiment may include the cover substrate 100 and the substrate 300 on the cover substrate 100. In addition, the first and second sensing electrodes 510 and 520 may be provided on the same surface of the substrate 300. An insulating layer and a bridge electrode are provided in an area where the first sensing electrode 510 is overlapped with the second sensing electrode 520, so that the first and second sensing electrodes 510 and 520 may be provided on the same surface of the substrate 300 without being shorted.

Referring to FIG. 6, the touch device according to the embodiment may include a touch panel provided on a display panel 900.

In detail, the cover substrate 100 is provided thereon with the first and second substrates 310 and 320 having the first and second sensing electrodes 510 and 520, respectively, and the touch device may be formed by assembling the second substrate 320 with the display panel 900. The second substrate 320 may be assembled with the display panel 900 through an adhesive layer A. For example, the cover substrate 320 and the display panel 900 may be combined with each other through the adhesive layer A including an optically clear adhesive (OCA).

The display panel 900 includes first and second display panel substrates 910 and 920. When the display panel 900 is a liquid crystal display panel, the display panel 900 may have a structure in which the first display panel substrate 910 including a thin film transistor (TFT) and a pixel electrode is combined with the second display panel substrate 920 including color filter layers while a liquid crystal layer is interposed between the first and second display panel substrates 910 and 920.

Further, the display panel 900 may be a liquid crystal display panel having a color filter on transistor (COT) structure formed by combining the first display panel substrate 910 formed thereon with a tin film transistor (TFT), a color filter, and a black matrix with the second display panel substrate 920 while the liquid crystal layer is interposed between the first and second display panel substrates 910 and 920. In other words, the TFT may be formed on the first display panel substrate 910, a protective layer may be formed on the TFT, and the color filter layer may be formed on the protective layer. In addition, the pixel electrode, which makes contact with the TFT, is formed on the first display panel substrate 910. In this case, to improve an aperture ratio and simplify a mask process, the black matrix may be omitted, and a common electrode may perform a function of the black matrix together with the inherent function thereof. When the display panel 900 is a liquid crystal panel, the display device may further include a backlight unit for supplying light onto a rear surface of the display panel 900.

When the display panel 900 is an organic light emitting device, the display panel 900 includes a self light-emitting device which does not require any additional light source. In the display panel 900, the thin film transistor is formed on the first display panel substrate 910, and an organic light-emitting device (OLED) making contact with the thin film transistor is formed. The OLED may include an anode, a cathode and an organic light-emitting layer formed between the anode and the cathode. In addition, the display panel 900 may further include the second display panel substrate 920, which performs the function of an encapsulation substrate for encapsulation, on the OLED.

Referring to FIG. 7, the display device according to the embodiment may include a touch window integrated with the display panel 900. That is, a substrate to support at least one electrode may be omitted. At least one electrode may be disposed on at least one surface of the display panel 900. That is, at least one electrode may be disposed on one surface of at least one of the first and second display panel substrates 910 and 920.

Referring to FIG. 7, the first sensing electrode 510 may be provided on one surface of the substrate 300 of the cover substrate 100. In addition, the first wire connected with the first sensing electrode 510 may be provided on one surface of the substrate 300. In addition, the second sensing electrode 520 may be provided on one surface of the display panel 900. In addition, the second wire connected with the second sensing electrode 520 may be provided on one surface of the display panel 900.

The adhesive layer A may be interposed between the substrate 300 and the display panel 900, so that the substrate 300 may be bonded to the display panel 900. A polarizing plate may be further provided under the substrate 300. The polarizing plate may be a linear polarizing plate or an anti-reflection polarizing plate. For example, when the display panel 900 is a liquid crystal display panel, the polarizing plate may be a linear polarizing plate. In addition, when the display panel 900 is an organic electroluminescent display panel, the polarizing plate may be an anti-reflection polarizing plate.

According to the touch device of an embodiment, at least one substrate supporting a sensing electrode may be omitted. Accordingly, a touch device having a thin thickness and a light weight may be formed.

Hereinafter, a touch device according to another embodiment will be described with reference to FIG. 8. In the following description, the details of the structures or components similar or the same as those of the above described embodiments will be omitted, and the same reference numbers will be assigned to the same elements.

Referring to FIG. 8, the touch device according to another embodiment may include a touch panel integrated with the display panel 900. In other words, a substrate for supporting at least one sensing electrode may be omitted.

For example, a sensing electrode, which serves as a sensor disposed in an active area to sense a touch, and a wire to apply an electrical signal to the sensing electrode, may be formed inside the display panel. In detail, at least one sensing electrode or at least one wire may be provided inside the display panel.

The display panel includes first and second display panel substrates 910 and 920. In this case, at least one of the first and second electrodes 510 and 520 is disposed between the first and second substrates 910 and 920. In other words, at least one sensing electrode may be provided on at least one of the first and second substrates 910 and 920.

Referring to FIG. 8, the first sensing electrode 510 may be provided on one surface of the substrate 300. In addition, the first wire connected with the first sensing electrode 510 may be provided on one surface of the substrate 300. In addition, the second sensing electrode 520 and the second wire may be interposed between the first display panel substrate 910 and the second display panel substrate 920. In other words, the second sensing electrode 520 and the second wire are provided inside the display panel, and the first sensing electrode 510 and the first wire may be provided outside the display panel.

The second electrode 320 and the second wire may be disposed on the top surface of the first display panel substrate 910 or the rear surface of the second display panel substrate 920. In addition, a polarizing plate may be additionally provided under the substrate 300.

When the display panel is a liquid crystal display panel and the second sensing electrode is formed on the top surface of the first display panel substrate 910, the sensing electrode may be formed together with a thin film transistor (TFT) and a pixel electrode. In addition, when the second sensing electrode is formed on the rear surface of the second display panel substrate 920, a color filter layer may be formed on the sensing electrode or the sensing electrode may be formed on the color filter layer. When the display panel is an organic light emitting device and the sensing electrode is formed on the top surface of the first display panel substrate 910, the sensing electrode may be formed with a thin film transistor or an organic light emitting device.

In the touch device according to another embodiment, at least one substrate supporting a touch device to be omitted. Accordingly, the touch device having a thin thickness and a light weight may be formed. In addition, the sensing electrode and the wire are formed together with the device formed in the display panel, so that the fabrication process can be simplified and the cost can be reduced.

FIGS. 9 to 12 are views showing one example of a touch device including the above-described touch panel.

Referring to FIG. 9, a mobile terminal 1000 may include an active area AA and an unactive area UA. The active area AA may sense a touch signal through the touch by a finger, and an instruction icon pattern part and a logo may be formed in the unactive area UA.

In addition, referring to FIG. 10, a portable laptop computer 2000 is shown as one example of a display device. The portable laptop computer 2000 may include a touch panel 2200, a touch sheet 2100, and a circuit board 2300. The touch sheet 2100 is provided on the top surface of the touch panel 2200. The touch sheet 2100 may protect a touch area TA. In addition, the touch sheet 2100 can improve the touch feeling of a user. The touch panel 2200 is provided a bottom surface thereof with a circuit board 2300 electrically connected with the touch panel 2200. The circuit board 2300 is a printed circuit board which has various parts to configure the portable laptop computer.

In addition, referring to FIG. 11, the touch panel is applicable to a vehicle navigation system 3000.

Further, referring to FIG. 12, the touch panel may be applied to an interior of a vehicle. In other words, the touch panel is applicable to various parts inside the vehicle to which the touch panel is applicable. Accordingly, the touch panel is applicable to a dashboard as well as a personal navigation display (PND), so that a center information display (CID) may be implemented. However, the embodiment is not limited to the above. In other words, the touch panel may be used for various electronic appliances, and is applicable to a wearable device attached to a human body.

The embodiment provides a touch panel having a novel structure capable of representing improved reliability and an ESD suppression effect.

According to the embodiment, there is provided a touch panel including a cover substrate including active and unactive areas, and a color film provided on the cover substrate. The color film includes a color part provided at a position corresponding to that of the unactive area, and the color part includes a conductive material.

As described above, the touch panel according to the embodiment includes the color film including the color part formed of the conductive material.

The color film can realize a desirable color according to the colors of the color part, and can prevent the wire electrode from being recognized from the outside.

In addition, as the color part includes the conductive material, and is electrically connected to a printed circuit board, the color part serves as the printing layer or the decoration layer while serving as the ground electrode.

Therefore, according to the touch panel of the embodiment, the area for the ground electrode can be enlarged. In other words, according to the touch panel of the embodiment, the ground electrode, which is formed only on the substrate according to the related art, can extend till the color film, so that the area for the ground electrode can be enlarged.

Further, according to the touch panel of the embodiment, as the ground electrode is formed in the color part including the color film, the area for the ground electrode can be enlarged without the increase in the unactive area of the substrate for the purpose of enlarging the area for the ground electrode.

As a result, according to the touch panel of the embodiment, the area for the ground electrode can be enlarged, so that the ESD suppression effect can be improved, thereby improving the whole efficiency of the touch panel.

In the preceding description of the embodiments, it will be understood that, when a layer (or film), a region, a pattern, or a structure is referred to as being "on" or "under" another layer (or film), another region, another pad, or another pattern, it can be "directly" or "indirectly" on the other substrate, layer (or film), region, pad, or pattern, or one or more intervening layers may also be present. Such a position of the layer has been described with reference to the drawings.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A touch panel comprising:
    a cover substrate including an active area and an unactive area; and
    a color film on the cover substrate, wherein the color film includes a color part provided at a position corresponding to a position of the unactive area and a light transmission part provided at a position corresponding to the active area, wherein the color part includes a conductive material;
    a first substrate on the cover substrate; and
    a second substrate on the first substrate;
    wherein the first substrate is provided thereon with a first sensing electrode extending in a first direction and a first wire electrode coupled to the first sensing electrode, and
    wherein the second substrate is provided thereon with a second sensing electrode extending in a second direction different from the first direction and a second wire electrode coupled to the second sensing electrode,
    wherein a printed circuit board is provided on the cover substrate and is provided on the first substrate,
    wherein the first wire electrode provided on the first substrate is coupled to a first surface of the printed circuit board,
    wherein the second wire electrode provided on the second substrate is exposed through a through hole at the first substrate and the second wire electrode is coupled to the first surface of the printed circuit board through the through hole,
    wherein the color part of the color film is coupled to a second surface of the printed circuit board opposite to the first surface,
    wherein the printed circuit board comprises a first bonding part and a second bonding part,
    wherein the first and second wire electrodes are connected with the first bonding part of the printed circuit board using a pad part and an anisotropic conductive film (ACF),
    wherein the second bonding part of the printed circuit board is electrically connected with the color part through a conductive tape,
    wherein the conductive material includes silver (Ag),
    wherein the conductive material is formed along an edge of at least one of both surfaces of the color film,
    wherein the conductive material includes a same material as the wire electrodes,
    wherein the conductive material is partially provided on the color part,
    wherein the unactive area includes first to fourth unactive areas, and
    wherein the conductive material is provided at a position of at least one area of two facing unactive areas in the first to the fourth unactive areas.

2. The touch panel of claim 1, wherein the color part is provided at a position corresponding to a position of the at least one of the first to fourth unactive areas.

3. The touch panel of claim 1, wherein the color part is provided on an entire portion of the unactive area.

4. The touch panel of claim 1, wherein the color part directly or indirectly contacts the printed circuit board.

5. The touch panel of claim 1, wherein at least one of the first and second sensing electrodes is formed in a mesh shape.

6. The touch panel of claim 1, wherein the conductive material is provided on an entire surface of the color part.

* * * * *